United States Patent
Glaser et al.

(10) Patent No.: US 11,501,260 B2
(45) Date of Patent: Nov. 15, 2022

(54) METHOD FOR AUTOMATICALLY TRANSMITTING AN IMMINENT EVENT VIA AN INTERFACE TO A TERMINAL POINT ASSOCIATED WITH A USER, AND A CONVERSION DEVICE DESIGNED THEREFOR

(71) Applicant: Unify GmbH & Co. KG, Munich (DE)

(72) Inventors: Martin Glaser, Bergkamen (DE); Michael Willmann, Witten (DE); Michael Volkmann, Herdecke (DE); Claus Rist, Bochum (DE)

(73) Assignee: Unify GmbH & Co. KG, Munich (DE)

( * ) Notice: Subject to any disclaimer, the term of this patent is extended or adjusted under 35 U.S.C. 154(b) by 303 days.

(21) Appl. No.: 16/073,108

(22) PCT Filed: Jan. 26, 2017

(86) PCT No.: PCT/EP2017/051697
§ 371 (c)(1),
(2) Date: Jul. 26, 2018

(87) PCT Pub. No.: WO2017/129708
PCT Pub. Date: Aug. 3, 2017

(65) Prior Publication Data
US 2019/0034880 A1    Jan. 31, 2019

(30) Foreign Application Priority Data
Jan. 27, 2016   (DE) .......................... 102016000871.7

(51) Int. Cl.
*G06Q 10/10* (2012.01)
*H04M 7/00* (2006.01)
*H04M 19/02* (2006.01)

(52) U.S. Cl.
CPC ........ *G06Q 10/109* (2013.01); *H04M 7/0003* (2013.01); *H04M 7/0012* (2013.01);
(Continued)

(58) Field of Classification Search
CPC .......................... G06Q 10/109; H04M 7/0003; H04M 7/0012; H04M 7/0024; H04M 19/02; H04M 2242/16
See application file for complete search history.

(56) References Cited

U.S. PATENT DOCUMENTS

| | | | |
|---|---|---|---|
| 6,526,274 B1 * | 2/2003 | Fickes ............... | H04M 3/42323 455/413 |
| 8,121,953 B1 * | 2/2012 | Orttung .............. | G06Q 10/1095 705/52 |

(Continued)

FOREIGN PATENT DOCUMENTS

| | | |
|---|---|---|
| DE | 102005018767 A1 | 10/2006 |
| DE | 102005018768 A1 | 11/2006 |

(Continued)

OTHER PUBLICATIONS

A. Blotny, N. Blum, L. Lange and T. Magedanz, "A platform providing bidirectional service integration for the dynamic long-tail service market," 2010 14th International Conference on Intelligence in Next Generation Networks, 2010, pp. 1-6, doi: 10.1109/ICIN.2010.5640900. (Year: 2010).*

(Continued)

*Primary Examiner* — Mehmet Yesildag
*Assistant Examiner* — Jeremy L Gunn
(74) *Attorney, Agent, or Firm* — Buchanan Ingersoll & Rooney PC

(57) ABSTRACT

A computer implemented method can include sending additional information concerning an upcoming event to a conversion unit for generation of an appointment reminder for (Continued)

the upcoming event that is to be sent to one or more endpoints. A telecommunication platform can process the appointment reminder to send a visual and/or audible signal to a user via one or more endpoint devices so that the reminder can be processed and responded to via at least one of the endpoint devices.

15 Claims, 7 Drawing Sheets

(52) U.S. Cl.
CPC ......... *H04M 7/0024* (2013.01); *H04M 19/02* (2013.01); *H04M 2242/16* (2013.01)

(56) References Cited

U.S. PATENT DOCUMENTS

| | | | | |
|---|---|---|---|---|
| 8,276,081 | B2* | 9/2012 | Boyd | G06Q 10/109 715/751 |
| 2004/0109541 | A1* | 6/2004 | Celi, Jr. | H04M 3/4936 379/88.13 |
| 2006/0209797 | A1* | 9/2006 | Anisimov | H04L 65/1009 370/352 |
| 2006/0285533 | A1* | 12/2006 | Divine | G06Q 10/109 370/352 |
| 2007/0116194 | A1* | 5/2007 | Agapi | H04M 7/0045 379/67.1 |
| 2009/0296911 | A1* | 12/2009 | Wang | H04M 7/0024 379/207.02 |
| 2010/0093382 | A1* | 4/2010 | Samaha | H04W 4/12 455/466 |
| 2016/0345132 | A1* | 11/2016 | Creighton | G01C 21/3697 |
| 2018/0234550 | A1* | 8/2018 | Lifson | H04L 12/28 |
| 2018/0338008 | A1* | 11/2018 | Trinite | H04L 12/189 |

FOREIGN PATENT DOCUMENTS

EP 2501118 A2 9/2012
WO WO-2005117410 A2 * 12/2005 ............. H04L 67/24

OTHER PUBLICATIONS

PCT International Search Report and Written Opinion for PCT/EP2017/051697 filed Jan. 26, 2017, dated Mar. 24, 2017.

* cited by examiner

METHOD FOR AUTOMATICALLY TRANSMITTING AN IMMINENT EVENT VIA AN INTERFACE TO A TERMINAL POINT ASSOCIATED WITH A USER, AND A CONVERSION DEVICE DESIGNED THEREFOR

CROSS-REFERENCE TO RELATED APPLICATIONS

This application is the United States National phase under 35 U.S.C. § 371 of PCT International Patent Application No. PCT/EP2017/051697, filed on Jan. 26, 2017, and claiming the benefit of priority of German national application no. 10 2016 000 871.7, filed on Jan. 27, 2016.

BACKGROUND OF THE INVENTION

Field of the Invention

This invention concerns a method for automatic transfer of an upcoming event, which is stored in an event-processing entity of a client assigned to a user, through an interface to an endpoint assigned to the user, as well as a computer program product for implementing the method, a machine-readable data carrier with the computer program product stored on it, and a corresponding conversion unit.

Background of the Related Art

The following terms are briefly explained for use in the following description:

A telecommunication platform (TC platform) is a switching center or telecommunications installation, for example (also called a PBX or "Private Branch Exchange").

An endpoint is, for example, a telephone, smartphone, computer used to establish or operate a telephone connection ("call") or a data connection, or another—possibly virtual—type of terminal.

An event-processing entity is, for example, a calendar or calendar function (scheduler), which can be implemented as an independent function or as a function integrated into a larger association—"Microsoft® Outlook," for example.

The following abbreviations are explained below:
API: Application Programming Interface
ATC: Advanced Telephony Connector
CMI: Cordless Multicell Integration
CSTA: Computer Supported Telecommunications Applications (ECMA)
CTI: Computer Telephony Integration (e.g., CSTA, TAPI)
DECT: Digital Enhanced Cordless Telecommunications
DTMF: dual-tone multi-frequency
ECMA: Ecma International Standardization Board
HFA: HiPath Feature Access
PBX: Telecommunication installation, Telecommunication platform, Switch
POT: Plain Old Telefony
SIP: Session Initiation Protocol
TAPI: Telephony Applications Interface (Microsoft)
TDM: Time Division Multiplexing
UTC: Universal Telephony Connector
WebRTC: Web Real-Time Communication It has proven difficult to integrate an external or internal event-processing entity through a suitable interface into a communication environment or telecommunication system.

BRIEF SUMMARY OF THE INVENTION

This invention addresses the problem of integrating an external event-processing entity, such as an appointment calendar like Microsoft® Outlook, or an internal event-processing entity—such as an internal appointment calendar, for example, that can later be integrated into a telecommunication platform if necessary—through a suitable interface into the communication environment or telecommunication system.

According to the invention, in the case of an upcoming appointment it is also possible for the user's or participant's endpoint or terminal—preferably a so-called Preferred Device—to receive information about the appointment. Even if the participant is not at his workplace, he still receives information about the pending appointment, designated hereinafter as an appointment reminder.

This invention allows reminders from scheduler or calendar applications to be displayed advantageously by an endpoint or terminal assigned to the user of a telecommunication platform. This has already been integrated into smartphones, but not every smartphone has the technical capacity or permission under company policy to connect to the company network and through it to a personal calendar. The invention addresses this situation by allowing the standard smartphone integration of appointment reminders into any terminal on a CTI-capable telecommunication platform.

This solution is made possible essentially by means of an independent or integrated conversion unit that connects the respective scheduler or calendar application's application program interface (API) via a CTI connector to a CTI-capable telecommunication platform.

BRIEF DESCRIPTION OF THE FIGURES

Additional advantages, features, and characteristics of the present invention are presented in the following description of advantageous embodiments with reference to the drawing. The figures show schematically.

DETAILED DESCRIPTION OF THE INVENTION

One preferred embodiment of the method provides that reminders from scheduler or calendar applications on typical analog (e.g., POT), TDM (e.g., ISDN, $U_{p0}$, DECT, CMI) and digital (e.g., HFA, SIP in LAN and WLAN) IP terminals can be signaled audibly or visually in wired and wireless configurations of a CTI-capable telecommunication platform.

In one preferred embodiment of the method according to the invention, reminders from scheduler or calendar applications on a CTI-capable telecommunication platform can also be signaled audibly or visually on WebRTC terminals, e.g., through the connectors known as Universal Telephony Connector, UTC, or Advanced Telephony Connector, ATC, based on the Session Initiation Protocol, SIP, and the Computer Supported Telecommunications Applications, CSTA, protocol.

In one preferred embodiment of the method according to the invention, from scheduler or calendar applications on a cloud-based event-processing entity are signaled audibly or visually by a WebRTC client and can also be audibly or visually signaled using a connector based on the Universal Telephony Connector, UTC, or Advanced Telephony Connector, ATC, through a CTI-capable telecommunication platform on typical analog (e.g., POT), TDM (e.g., ISDN, $U_{p0}$, DECT, CMI) and digital (e.g., HFA, SIP in LAN and WLAN) IP terminals in wired and wireless configurations of an individual CTI-capable telecommunication platform as well as a network of telecommunication platforms.

A preferred embodiment of the method according to the invention adds the advantage that improved and easier handling is possible for the user due to the additional signaling and the related additional information.

Another preferred embodiment of the method according to the invention results in the advantage that, even in the absence of a concrete feedback message from the endpoint, at the end of a known time period—usually called a Timeout—the client is automatically notified of the result of the decision that the appointment reminder in question was not accepted. This keeps the client clearly aware of the status of that appointment reminder, even when the message originates from the telecommunication platform rather than the endpoint.

This invention also includes a computer program that implements the invented method and a machine-readable data carrier suitable for storing this computer program.

The conversion unit according to the invention is characterized in that it includes a control device suitable for executing the method according to the invention or the computer program according to the invention.

In one preferred embodiment of the conversion unit according to the invention, it is integrated into a telecommunication platform, which provides the advantage that no additional hardware/server is necessary.

Figure 1:
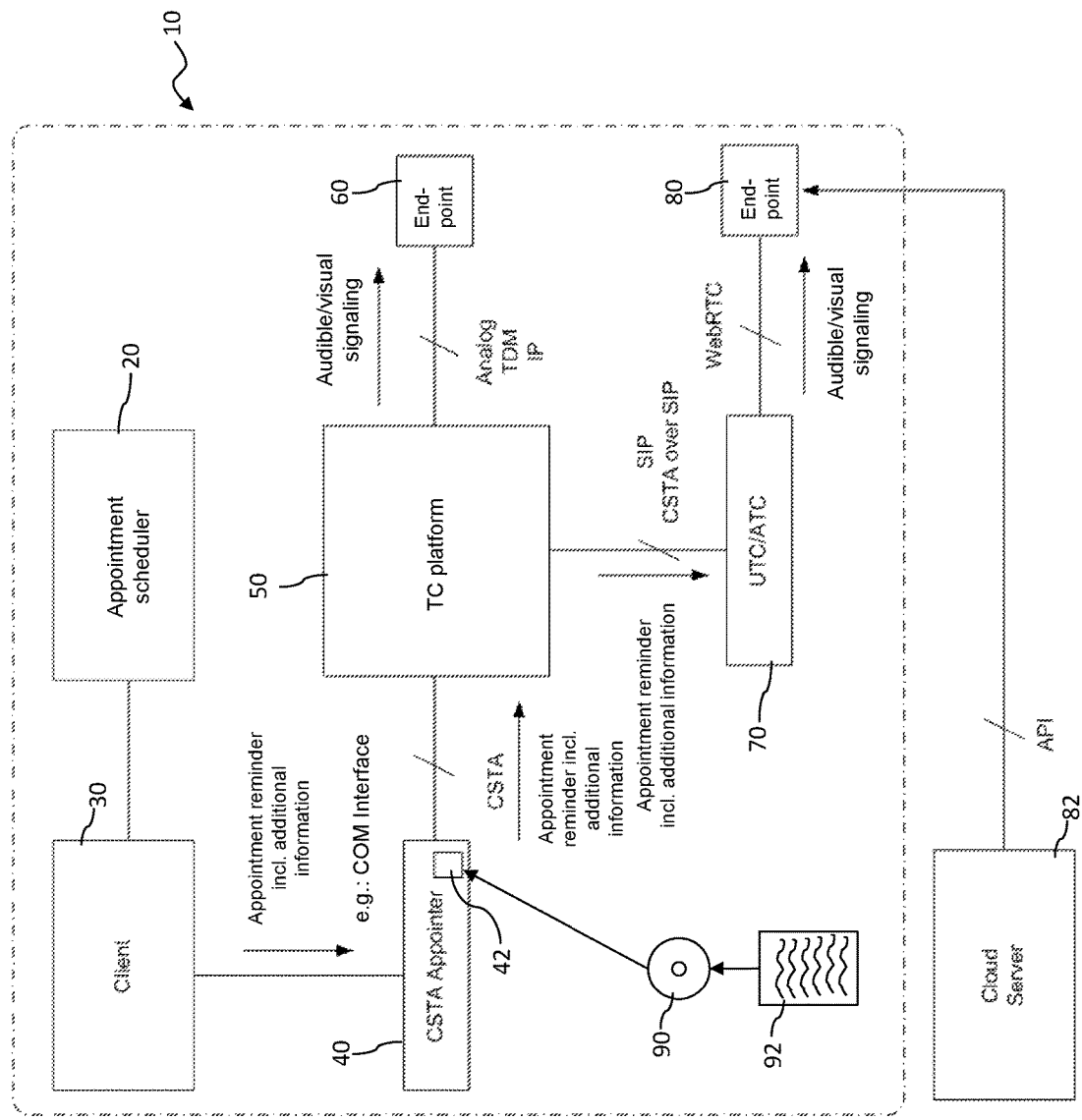
FIG. 1 a first layout diagram of an embodiment of a telecommunication system in which this invention is used, FIG. 2 a second layout diagram of an embodiment of a telecommunication system in which this invention is used, FIG. 3 a third layout diagram of an embodiment of a telecommunication system in which this invention is used, FIG. 4 a fourth layout diagram of an embodiment of a telecommunication system in which this invention is used, FIG. 5 a first and second exemplary message sequence demonstrating a first or second embodiment of the method according to the invention, FIG. 6 a third to sixth exemplary message sequence demonstrating a third to sixth embodiment of the method according to the invention FIG. 7 a seventh and eighth exemplary message sequence demonstrating a seventh or eighth embodiment of the method according to the invention, and FIG. 8 a ninth and tenth exemplary message sequence demonstrating a ninth or tenth embodiment of the method according to the invention.

FIG. 1 shows a first embodiment of a telecommunication system 10 in which this invention is being used, i.e., the invented method in particular is being carried out as described below.

The telecommunication system 10 comprises a client 30 assigned to a user, that picks up or receives delivery of an upcoming or pending event from an (external) appointment scheduler 20—used here as an example of an event-processing entity—wherein additional information is delivered in addition to the event. This additional information conveys the type of event and the desired repetition of an appointment reminder to be set, for example. The client 30 sends this event and the additional information—via a COM interface, for example—to a CSTA Appointer 40, serving as the conversion unit. The CSTA Appointer 40 comprises a control device 42, which executes the method underlying the invention using a schematically represented computer program 92 (stored on a CD-ROM 90 as an example of a data carrier), generates an appointment reminder for this upcoming event, and sends the appointment reminder and the additional information via CSTA to a telecommunication platform 50.

The telecommunication platform 50 processes these data and signals the appointment reminder audibly and/or visually by means of a suitable signal via analog, TDM, IP, WebRTC, or similar means to a wired or wireless endpoint 60 which is also assigned to the user, such as a smartphone or land-line telephone. In addition, with this embodiment, the appointment reminder and additional information are transferred via SIP or CSTA over SIP to a UTC or ATC connector 70, which sends an audible and/or visual signal via WebRTC to another endpoint 80 that is assigned to a telephone unit. Each of the endpoints 60, 80 processes the signal, in order to accept or reject the first appointment reminder as a result, and sends that result back to the client 30. The endpoints 60 and 80 are compatible—endpoint 60 is a so-called legacy endpoint (SIP, HFA, TDM, DECT, CMI, etc.), and endpoint 80 is a WebRTC endpoint. The user can conduct conversations from the endpoints 60 and/or/alternatively 80. A server 82 connected via the cloud is connected with the endpoint 80 through an application-specific program interface (API).

Figure 2:
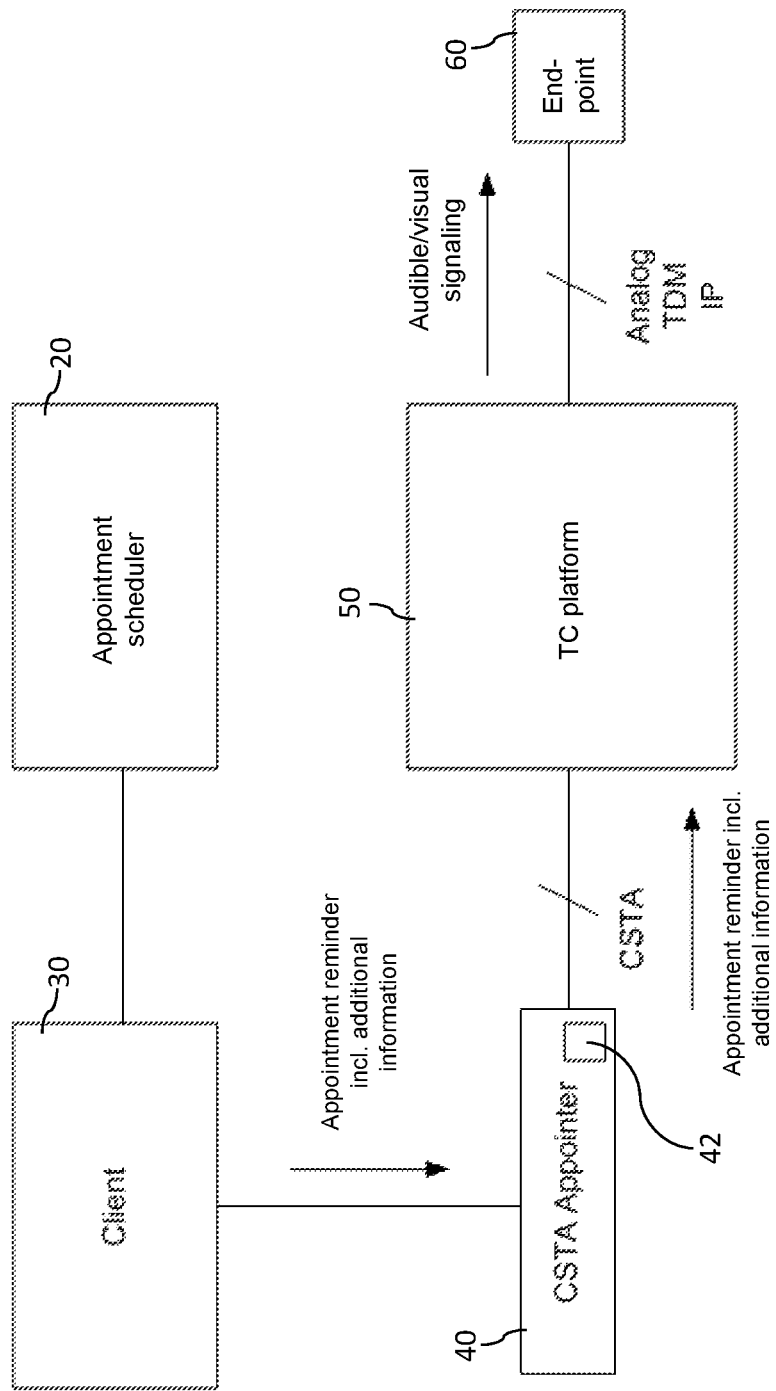

FIG. 2 shows a second, more simply configured embodiment of a telecommunication system 10 in which this invention is being used, i.e., the invented method in particular is being carried in a similar fashion. As can be seen, the second embodiment does not have any connector 70 or a corresponding endpoint, and so does not include the steps related to those components.

Figure 3:
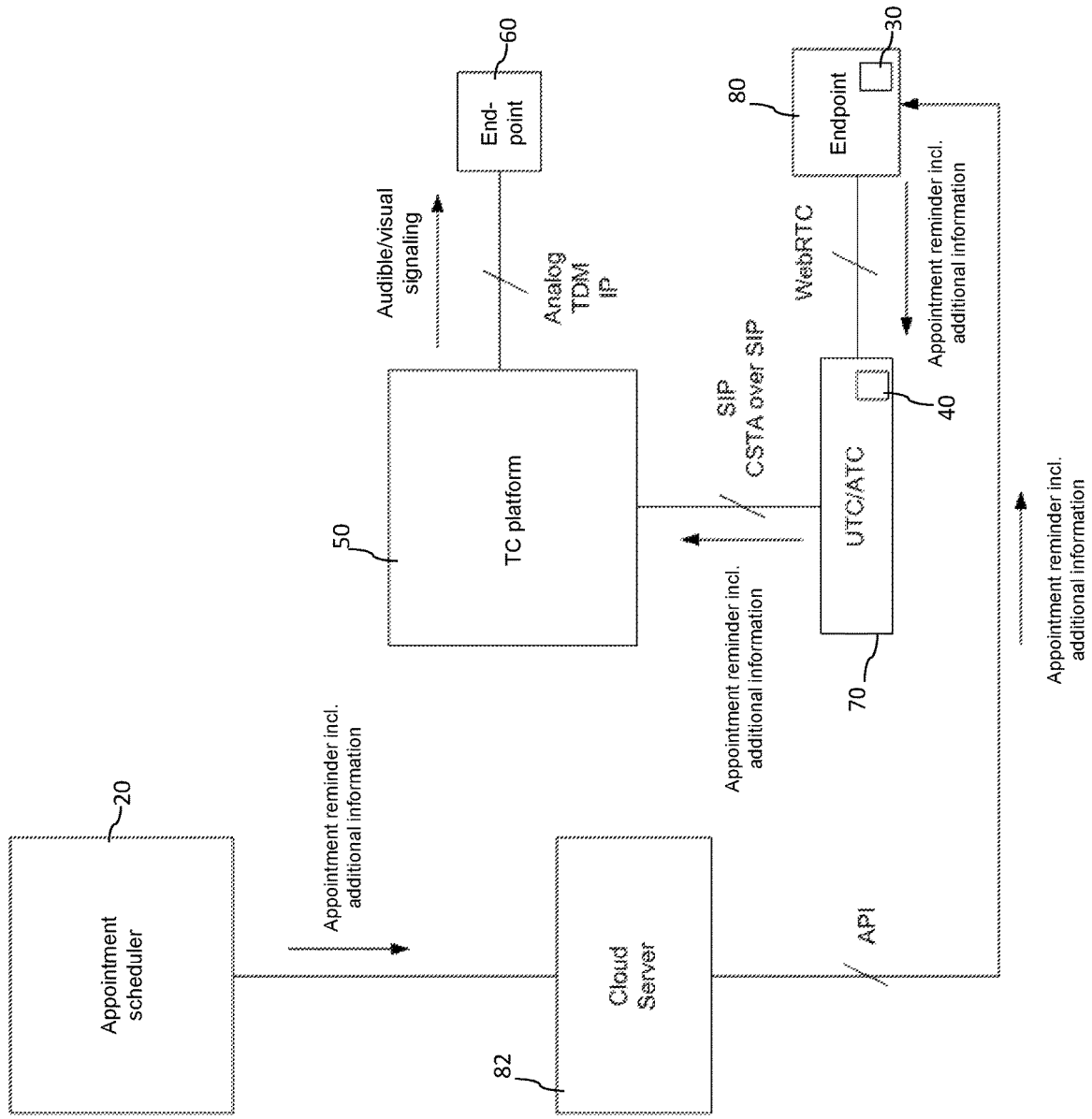

FIG. 3 shows a third embodiment, also modified in comparison to the first embodiment, of a telecommunication system 10 in which this invention is being used, i.e., the invented method in particular is being carried out in a similar fashion. As can be seen, it differs from the first embodiment primarily in that the appointment scheduler 20 is queried by a server 82 connected via the cloud and is connected to an endpoint 80 through an application-specific program interface (API). The endpoint 80 operates in the roles of both client and endpoint. In this embodiment, the conversion unit 40 is integrated into the connector 70, and the endpoint 80 can carry out the audible/visual signaling by itself (through a client 30 integrated into it) or can be prompted by the platform 50 as in FIG. 1. The appointment reminder and additional information are converted for visual/audible signaling by the platform 50 as in FIG. 1.

Figure 4:
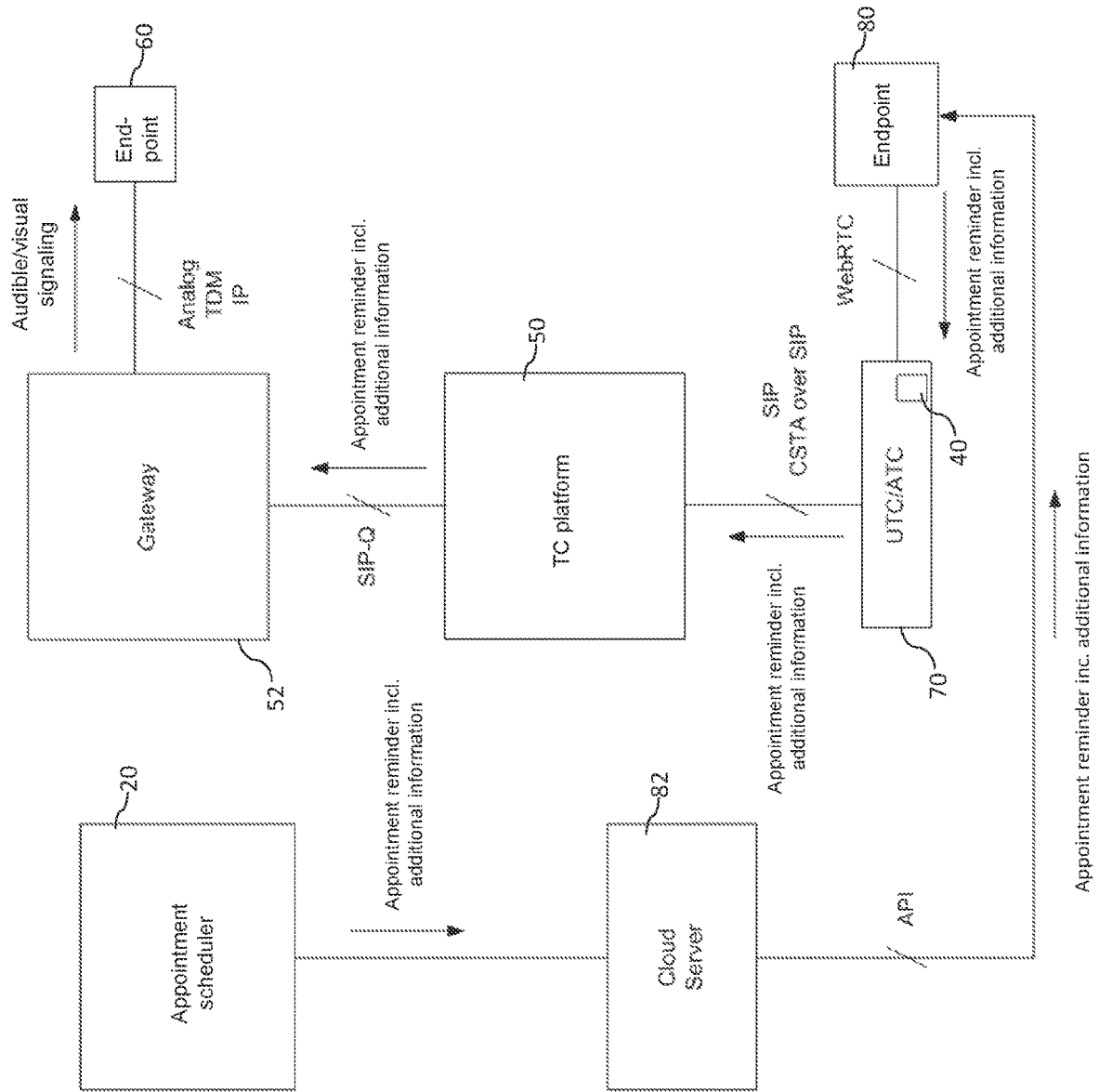

A fourth embodiment, shown in FIG. 4, differs from the third embodiment in that a gateway 52 is placed between the telecommunication platform 50 and the endpoint 60. This allows the method according to the invention to be used in a network as well. It should be mentioned that, in this embodiment, the appointment reminder and additional information are transferred by the telecommunication platform 50 to the gateway 52 via SIP-Q. The conversion unit 40 is integrated into the connector 70.

In this configuration, according to the invention, signaling is sent from a conversion unit 40—also called a "CSTA Appointer"—to a telecommunication platform 50. Audible/visual signaling should be understood to mean the standard ringing or a corresponding screen display on an endpoint/telephone. The initiating signal is generated in the appointment scheduler 20 and travels through multiple entities to the endpoint 60 and/or 80.

The expansion of ECMA-269 for appointments (called Appointment Services) would be an appropriate example of forwarding appointment information from a client (e.g., RESTful) through a standard interface to a PBX in order to signal that appointment information to the user's stationary or mobile endpoint in the form of an appointment call. Standardization through CSTA offers PBX manufacturers the surety of configuring multiple calendar and appointment solutions in a consistent format and, if necessary, independently of other changes in the calendar and event solutions field.

Preferably, the CSTA expansions can be transferred by the SIP-Q facility CSTA container when networking PBX systems, in order to connect soft switches and gateways.

OTHER APPLICATION EXAMPLES

Acceptance (Accept)

Figure 5:
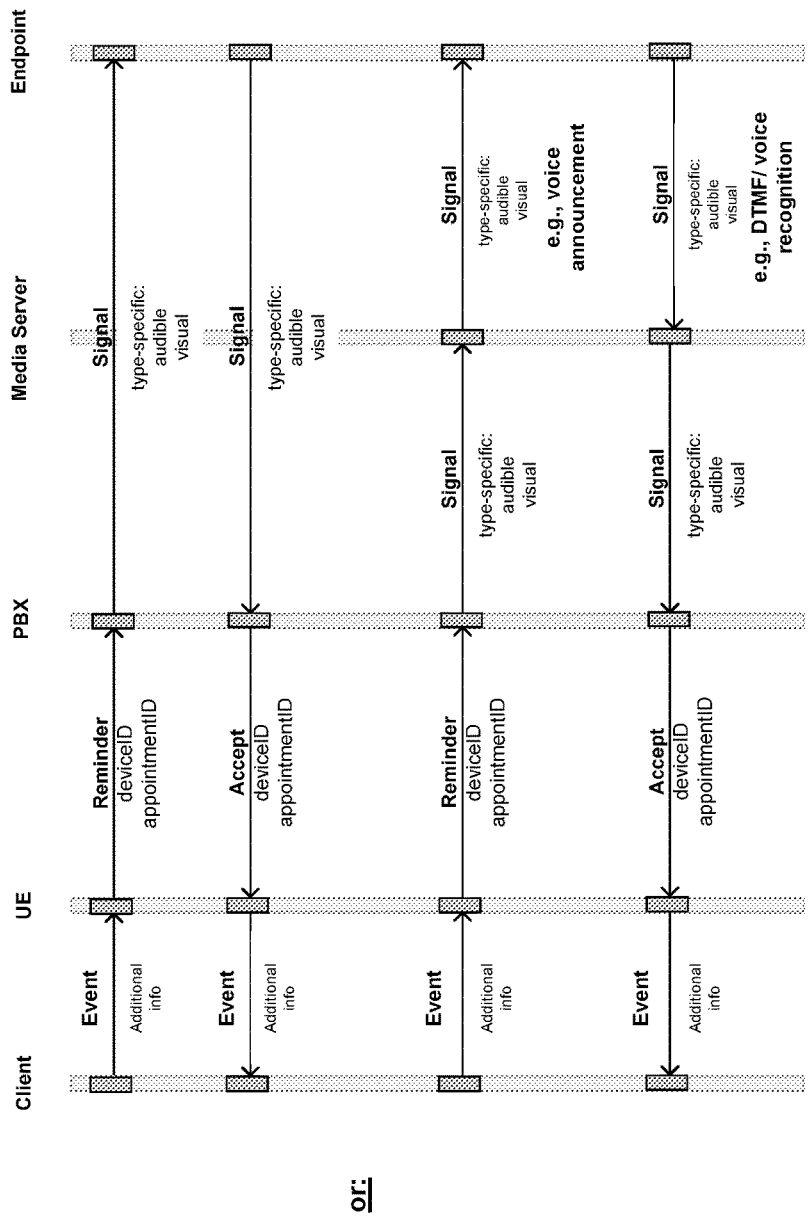

FIG. 5 shows a positively acknowledged appointment reminder. Depending on the configuration of the endpoint or terminal, the reminder is sent directly to the terminal or through a media server. Here the conversion unit is designated as UE. Examples of reminders on a telecommunication platform can be audible/visual signals such as ringing and screen displays on conventional telephone endpoints, as well as analog, TDM, or IP or similar wired or wireless telephone endpoints and WebRTC clients. If the reminder is sent through a media server, voice announcements and DTMF/voice recognition, for example can generate the acceptance information.

Regarding the additional information, for example, the type of invitation and desired reminder repetition can be transmitted. Acceptance is preferably timer-controlled in the PBX and monitored in the client. When the acceptance is routed to the client, appointment updates can be forwarded from the client to the inviter.

Delete (Cancel)

Figure 6:
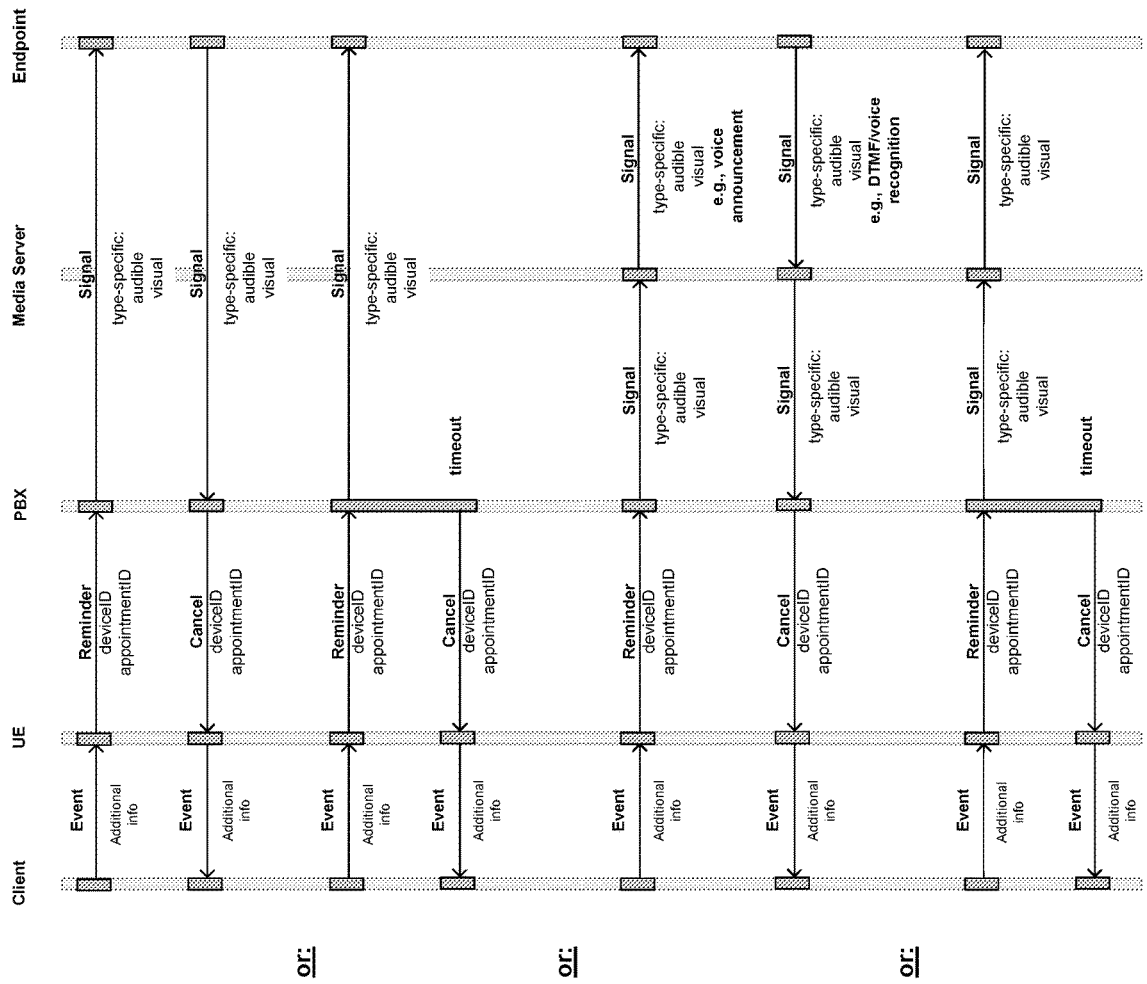

FIG. 6 shows a negatively acknowledged reminder. Depending on the configuration of the terminal, the reminder is sent directly to the terminal or through a media server. Examples of reminders on a telecommunication platform can likewise be audible/visual signals such as ringing and screen displays on conventional telephone endpoints and WebRTC clients. If the reminder is sent through a media server, voice announcements and DTMF/voice recognition can generate the cancellation information.

Depending on the terminal type, the reminder is rejected at the endpoint or by timing out in the telecommunication platform (PBX). When the rejection is routed to the client, appointment updates can be forwarded from the client to the inviter.

Making Appointments (Scheduling)

Figure 7:
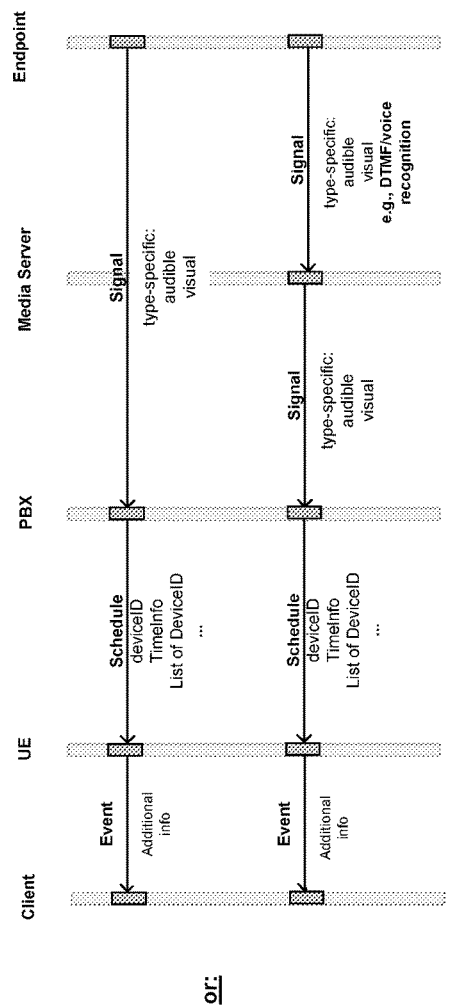

FIG. 7 shows how an appointment can be scheduled using the terminal. Although this process could be considered unwieldy, it is included here as a possibility for reasons of completeness. Examples of a scheduled appointment on a telecommunication platform can likewise be audible/visual signals such as ringing and screen displays on conventional telephone endpoints and WebRTC clients. If the scheduled appointment is sent through a media server, voice announcements and DTMF/voice recognition can generate the scheduled appointment information.

Networking

Figure 8:
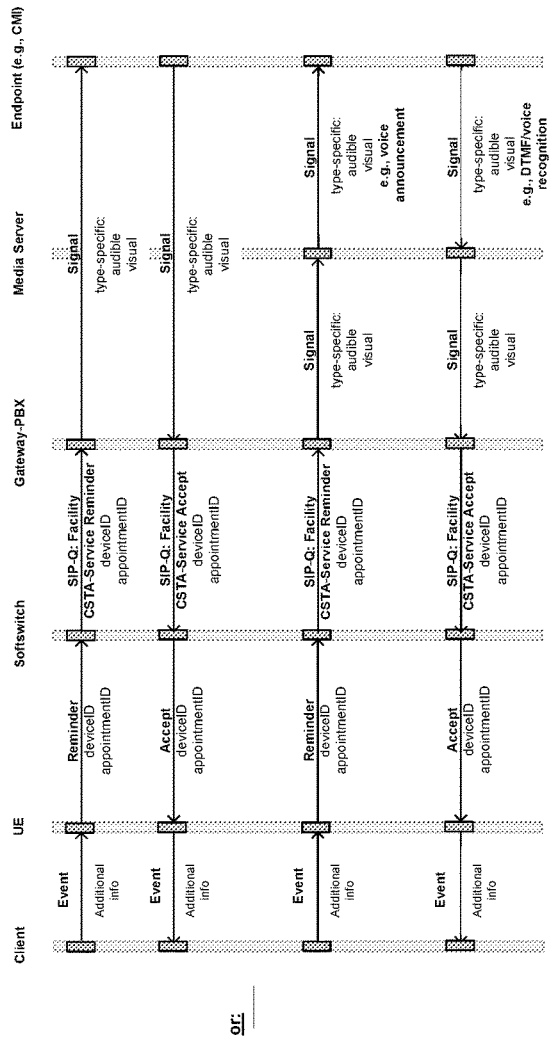

FIG. 8 shows a positively acknowledged reminder (negative acknowledgement is the same), exchanged by networking. The user is registered on a soft switch, for example, and has an assigned wireless telephone on a gateway PBX (e.g., CMI). Depending on the configuration of the terminal, the reminder is sent directly to the terminal or through a media server on the gateway PBX. Examples of reminders on a telecommunication platform can be audible/visual signals such as ringing and screen displays on conventional telephone endpoints and WebRTC clients. If the reminder is sent through a media server, voice announcements and DTMF/voice recognition can generate the acceptance or cancellation information.

The appointment information is transmitted in the SIP-Q facility, for example, to a telephone unit for CSTA services.

UTC/ATC—Universal or Advanced Telephony Connector

Two connectors are provided for modern cloud communication servers:
Universal Telephony Connector (UTC) or Generic Telephony Connector (GTC)
Advanced Telephony Connector (ATC)
These two connectors have different performance characteristics and allow telecommunication platforms to be integrated into cloud communication systems.

It should be understood that, with this invention, there is a correlation between features described with respect to method steps and features described with respect to corresponding equipment. In this regard, described method features are to be considered as equipment features that are part of the invention—and vice versa—even when this is not explicitly stated.

It should be noted that the features of the invention described by referencing the presented embodiments, for example the type and configuration of individual components of the telecommunication system, individual announcements, signals, and parameters, can also be present in other embodiments, unless stated otherwise or prohibited for technical reasons. Not all features of individual embodiments described in combination must necessarily always be implemented in any one particular embodiment.

LIST OF REFERENCE INDICATORS

10=Telecommunication system
20=Appointment scheduler/Event-processing entity
30=Client
40=Conversion unit/CSTA Appointer
42=Control device
50=Telecommunication platform
52=Gateway
60=Endpoint
70=Connector
80=Endpoint
82=Cloud/Cloud (communication) server
90=Machine-readable data carrier
92=Computer program

What is claimed is:
1. A computer-implemented method comprising:
a first endpoint of a user receiving a first appointment reminder for an upcoming telecommunication event, the first appointment reminder including first additional information concerning the upcoming event;
the first endpoint sending the first appointment reminder including the first additional information to a conversion unit via a first communication interface utilizing a first communication protocol for transmission of the first appointment reminder, in response to the first appointment reminder, the conversion unit generating a second appointment reminder for the upcoming event based on the first additional information of the first appointment reminder and sending the second appointment reminder to a telecommunication platform via a second communication interface for sending the second appointment reminder to at least one second endpoint associated with the user, the second communication interface utilizing a second communication protocol for transmission of the second appointment reminder, the second communication protocol being a different communication protocol than the first communication protocol, the at least one second endpoint associated with the user being connectable to the telecommunication platform, the first endpoint being unauthorized for connection to the telecommunication platform and being prevented from connecting to the telecommunication platform, processing, by the telecommunication platform, the second appointment reminder, generating a signal, and the telecommunication platform sending the generated signal toward the second endpoint, wherein the generated signal is adapted to the second endpoint and includes additional information that is based on the first additional information, and processing, by the second endpoint, the signal and the first additional information from the telecommunication platform for the user to accept or reject the second appointment reminder as a result for sending the result in response to the second appointment reminder.

2. The method of claim 1, wherein the conversion unit is a CSTA Appointer in an environment based on the Session Initiation Protocol and the Computer Supported Telecommunications Applications protocol, and the CSTA Appointer sends the second appointment reminder towards the second endpoint for transmission of the generated signal to the second endpoint based on analog, Time Division Multiplexing, or IP.

3. The method of claim 1, wherein the conversion unit includes a Universal Telephony Connector or Advanced Telephony Connector.

4. The method of claim 3, wherein the generated signal is adapted for transmission to the second endpoint based on HiPath Feature Access, Cordless Multicell Integration, DECT, SIP, Web Real-Time Communication, Time Division Multiplexing, or is generated for transmission across a network through an SIP-Q-Gateway.

5. The method of claim 4, wherein the telecommunication platform sends the generated signal to a media server, which adds at least one of an additional audible signal or visual signal to the signal and routes the so-modified signal to the second endpoint.

6. The method of claim 5, comprising:
after a preset length of time has elapsed without receiving the result from the second endpoint, the telecommunication platform automatically sending a notification that the appointment reminder was rejected.

7. A non-transitory computer readable medium storing a computer program thereon so that when the program is executed, a computer device performs a method, the method comprising:
in response to receiving a first appointment reminder for an upcoming telecommunication event including first information from a first endpoint of a user via a first communication interface utilizing a first communication protocol for transmission of the first appointment reminder, the computer device generating a second appointment reminder for the upcoming event based on the first additional information of the first appointment reminder and sending the second appointment reminder to a telecommunication platform via a second communication interface for sending the second appointment reminder to at least one second endpoint associated with the user, the second communication interface utilizing a second communication protocol for transmission of the second appointment reminder, the second communication protocol being a different communication protocol than the first communication protocol, the at least one second endpoint associated with the user being connectable to the telecommunication platform, the first endpoint being unauthorized for connection to the telecommunication platform and being prevented from connecting to the telecommunication platform, the second appointment reminder being sent via the second communication interface such that the second appointment reminder is processable by a telecommunication platform for generating a signal for sending the generated signal toward a second endpoint of the user so that the generated signal generated by the telecommunication platform is adapted to the second endpoint and includes additional information that is based on the first additional information such that the second appointment reminder is processable by the second endpoint for the user to accept or reject the second appointment reminder as a result for sending the result in response to the second appointment reminder.

8. The non-transitory computer readable medium of claim 7, wherein the computer device includes a control device.

9. The non-transitory computer readable medium of claim 7, wherein the computer device includes a Universal Telephony Connector or an Advanced Telephony Connector.

10. A telecommunication apparatus comprising:
a computer device configured as a conversion unit that is communicatively connectable to a first endpoint via a first communication interface and connectable to a telecommunication platform and/or a second communication endpoint via a second communication interface, the first endpoint being associated with a user and the second endpoint being associated with the user, the first communication interface utilizing a first communication protocol, the second communication interface utilizing a second communication protocol, the second communication protocol being a different communication protocol than the first communication protocol;
the computer device configured to respond to receiving a first appointment reminder for an upcoming telecommunication event that includes first information from the first endpoint via the first communication interface by generating a second appointment reminder for the upcoming event based on the first additional information of the first appointment reminder and sending the second appointment reminder to the telecommunication platform or the second endpoint via a second communication interface for sending the second appointment reminder to the second endpoint, the second endpoint associated with the user being connectable to the telecommunication platform, the first endpoint being unauthorized for connection to the telecommunication platform and being prevented from connecting to the telecommunication platform.

11. The telecommunication apparatus of claim 10, wherein:
the second appointment reminder is sendable via the second communication interface to the telecommunication platform such that the second appointment reminder is processable by the telecommunication platform for generating a signal for sending the generated signal toward the second endpoint of the user so that the generated signal generated by the telecommunication platform is adapted to the second endpoint and includes additional information that is based on the first additional information such that the second appointment reminder is processable by the second endpoint for the user to accept or reject the second appointment reminder as a result for sending the result in response to the second appointment reminder.

12. The telecommunication apparatus of claim 11, comprising the first endpoint, the second endpoint, the telecommunication platform, and wherein the computer device includes a Universal Telephony Connector or an Advanced Telephony Connector.

13. The telecommunication apparatus of claim 11, comprising the first endpoint, the second endpoint, the telecommunication platform, and a gateway, the gateway communicatively connecting the telecommunication platform to the second endpoint via a third communication interface.

14. The telecommunication apparatus of claim 13, wherein the gateway communicatively connected to the second endpoint via analog, Time Division Multiplexing, or IP.

15. The telecommunication apparatus of claim 14, wherein the second communication interface is based on SIP or CSTA over SIP and/or the first communication interface is via WebRTC.

* * * * *